June 17, 1969  F. E. ELLIS  3,450,005
FLUID PRESSURE MOTORS FOR PRODUCING STRAIGHT-LINE MOTION
Filed Jan. 30, 1967
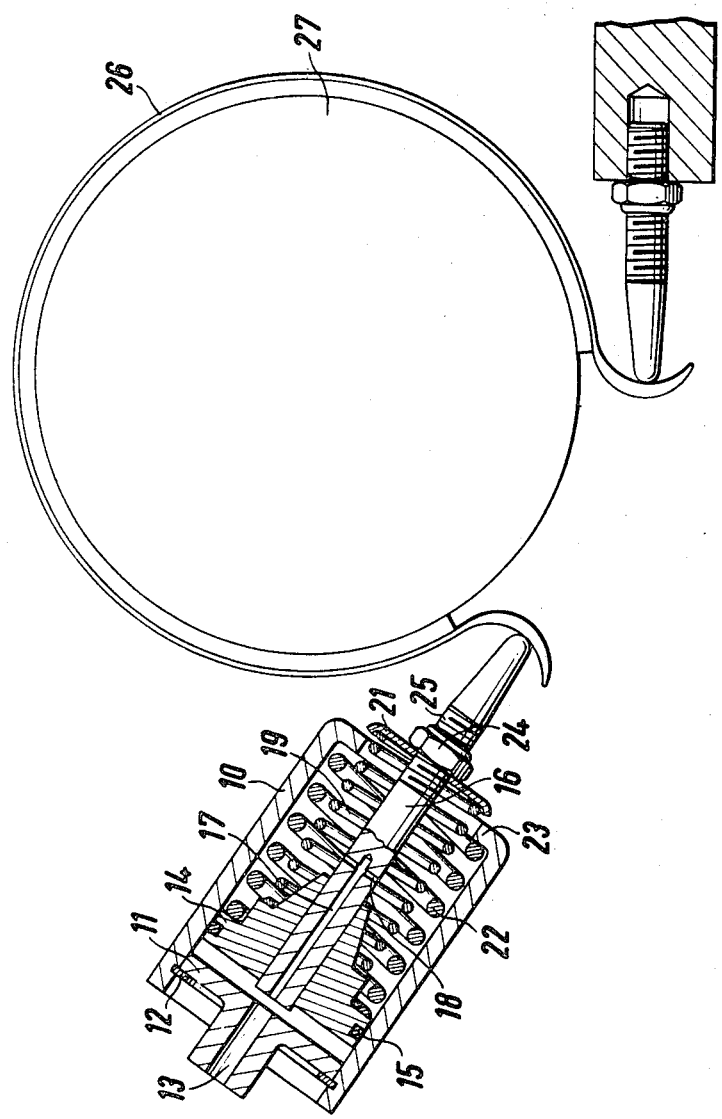
INVENTOR
Frederick E. Ellis
BY Lawrence J. Winter
ATTORNEY

United States Patent Office 3,450,005
Patented June 17, 1969

3,450,005
FLUID PRESSURE MOTORS FOR PRODUCING STRAIGHT-LINE MOTION
Frederick E. Ellis, Leamington Spa, England, assignor to Automotive Products Company Limited, Leamington Spa, Warwickshire, England
Filed Jan. 30, 1967, Ser. No. 612,589
Claims priority, application Great Britain, Feb. 9, 1966, 5,691/66
Int. Cl. F15b *11/10;* F01b *7/20;* F16j *1/10*
U.S. Cl. 91—189         3 Claims

ABSTRACT OF THE DISCLOSURE

A fluid pressure motor for producing straight-line motion has its piston mounted to slide on a piston rod against the resistance of a spring and arranged to close a passage in the piston rod, by passing the piston, after being moved a short distance along the piston rod by fluid pressure, so that initial leakage past the piston, and yielding of the spring, enable the thrust on the piston rod to be built up gradually.

---

This invention relates to fluid pressure motors for producing straight-line motion and consisting of a piston slidably mounted in a cylinder.

For some applications, including the engagement of band brakes to hold reaction elements of gear trains in automatic transmission mechanisms for motor vehicles, it is desirable that sudden application of the full operating thrust of the motor to the part moved thereby should be avoided, so that the movement of the part takes place smoothly and progressively.

We have previously proposed, in our pending patent application No. 34,551/65, to provide a compression spring between the piston and the part operated thereby, but it has been found that the spring does not in all cases absorb sufficiently the initial pressure surge applied to the piston. It is the object of the present invention to provide an improved arrangement of fluid pressure motor which includes additional means for absorbing the initial pressure surge.

According to the present invention in a fluid pressure motor for producing straight-line motion and including a piston slidably mounted in a cylinder, the piston being slidably mounted on a piston rod extending through one end of the cylinder, and a spring being provided which acts between the said piston and an abutment on the piston rod to transmit thrust, exerted on the piston by fluid pressure acting in the other end of the cylinder, to the piston rod, a leakage path is provided to permit fluid admitted to the said other end of the cylinder to flow past the piston and is closed by a predetermined movement of the said piston, relative to the piston rod, produced by the fluid pressure acting on the said piston.

A further spring preferably provided which acts between the piston and an abutment in the cylinder to return the piston to a predetermined position relative to the cylinder.

The invention is hereinafter described with reference to the accompanying drawing which shows one form of fluid pressure motor according to the invention, the said motor being used to engage a band brake with a brake drum.

Referring to the drawing, the fluid pressure motor comprises a cylinder 10, closed at one end by a closure member 11 held in position by a clip ring 12, an aperture 13 in the closure member 11 serving for connecting that end of the cylinder member to a source of fluid pressure (not shown), and a piston 14 slidable in the cylinder 10, a fluid-tight packing 15 being provided between the piston and the cylinder. The piston 14 is slidably mounted on a piston rod 16 which projects outwardly through the other end of the cylinder 10, the piston rod 16 being formed with an axial bore 17 extending from its end nearer to the closed end of the cylinder to a transverse bore 18 extending diametrally through the rod 16. A first spring 19 acting between the piston 14 and an abutment 21 on the piston rod urges the piston 14 towards the end of the piston rod 16 adjacent the closed end of the cylinder 10, and a second spring 22 acting between the said piston and an abutment 23 in the cylinder urges the said piston also towards the closed end of the cylinder. The spring abutment 21 on the piston rod is supported by a nut 24 mounted on a screw-thread 25 on the piston rod so as to be adjustable along the said rod to adjust the position on the said rod which the piston 14 takes up when the first spring 19 is fully extended. The position of the transverse bore 18 in the piston rod 16 is such that it is closed by the piston 14 when the latter has moved relative to the piston rod by a distance which depends on the position of the spring abutment 21.

When no fluid pressure is applied to the motor, the piston 14 takes up a predetermined position close to the closure member 11 due to the action of the second spring 22, and the piston rod 16 takes up a predetermined position relative to the piston 14 due to the action of the first spring 19, the bores 17 and 18 in the piston rod 16 providing an open passage from one side of the piston 10 to the other.

When fluid under pressure is admitted to the cylinder through the aperture 13, the piston 14 is displaced, but the pressure acting on it is reduced as compared with the total pressure available due to the fact that some leakage takes place through the bores 17 and 18 in the piston rod. The movement of the piston compresses both springs 19 and 22 and applies a gradually increasing thrust to the piston rod 16 through the first spring 19 until the piston 14 has moved far enough along the piston rod 16 to close the transverse bore 18 in the latter, when the full available thrust is exerted.

The spring abutment 21 on the piston rod 16 may also cooperate with the cylinder 10 to limit the return movement of the piston rod when the fluid pressure is released, the peripheral portion of said abutment 21 engaging with an inturned flange at the open end of the cylinder 10, which flange serves as the abutment 23 for the spring 22.

As suggested above, the fluid pressure motor according to the present invention may be used to apply a band brake 26 to a drum 27 to hold a reaction element of a gear train in an automatic transmission mechanism. Other possible uses include the closing of windows, doors and the like.

It will be understood that, although leakage of the operating fluid is permitted during the intial stages of operation of the motor, there is no leakage when the stroke has been completed, so that the full available thrust is maintained to hold the operated part in the position to which it is moved by the motor.

The fluid pressure for operating the motor may be air pressure or liquid pressure.

I claim:

1. A fluid pressure motor for producing straight-line movement comprising a cylinder, a closure member closing off one end of said cylinder, said other end of said cylinder being open, a piston rod disposed in said cylinder and extending out of said open end, a piston slidably disposed in said cylinder and slidably mounted on said piston rod adjacent said closed end, a first abutment means in said cylinder adjacent said open end, a first biasing means disposed beween said first abutment means and said piston for urging said piston toward said closure member, a second abutment means fixed to said piston rod adjacent said open end, a second biasing means disposed between said second abutment means and said piston for urging said piston toward said closure member, fluid pressure inlet means in said closure member in communication with said cylinder interior adjacent said closed end of the cylinder for supplying fluid under pressure thereto, longitudinal passage means in said piston rod extending from the end of said rod disposed adjacent said closed end to a point beyond the axial length of said piston, said longitudinal passage being in communication with said fluid pressure inlet means, and transverse passage means in said rod in communication with the longitudinal passage means at the point beyond the axial length of said piston and with said cylinder on the opposite side thereof from said closed end, whereby said piston is positioned adjacent the closed end of said piston when the supply of fluid under pressure is cut off, and said piston is movable to a position substantially beyond the position where said transverse passage is closed off by said piston so thrust exerted on said piston by fluid pressure acts on the piston rod continuously through said second biasing means before and after said piston has moved to close off said transverse passage means.

2. The motor of claim 1 wherein said first biasing means is disposed outwardly of said second biasing means, and said biasing means are coiled compression springs.

3. The motor of claim 2 wherein said open end is provided with a central opening through which said rod extends and said second abutment means is an annular flange mounted on said rod, and threaded adjustment means are provided to adjust the axial position of said flange with said rod.

References Cited

UNITED STATES PATENTS

| | | | |
|---|---|---|---|
| 2,514,747 | 7/1950 | Daniels | 91—189 |
| 2,633,712 | 4/1953 | Sheppard | 92—63 X |
| 2,858,804 | 11/1958 | Banker | 92—84 X |
| 2,932,280 | 4/1960 | Vielmo | 92—113 X |
| 2,966,888 | 1/1961 | Jania et al. | 92—52 |
| 3,118,349 | 1/1964 | Combs | 92—129 X |
| 3,353,637 | 11/1967 | Chana | 92—62 X |

MARTIN P. SCHWADRON, *Primary Examiner.*

I. C. COHEN, *Assistant Examiner.*

U.S. Cl. X.R.

91—431; 92—52, 65, 84, 113, 129